3,394,376
METHOD AND MEANS FOR SETTING A VEHICLE IN A PREDETERMINED POSITION
Claude H. Picou, Paris, Pierre Laurent, Fontenay-aux-Roses, and Jean Gaignebet, Antony, France, assignors to Societe d'Etudes, Recherches et Construction Electroniques (SERCEL) Societe Anonyme, Montrouge, Hauts-de-Seine, France
Filed Mar. 14, 1966, Ser. No. 533,935
Claims priority, application France, Mar. 12, 1965, 8,932
5 Claims. (Cl. 343—112)

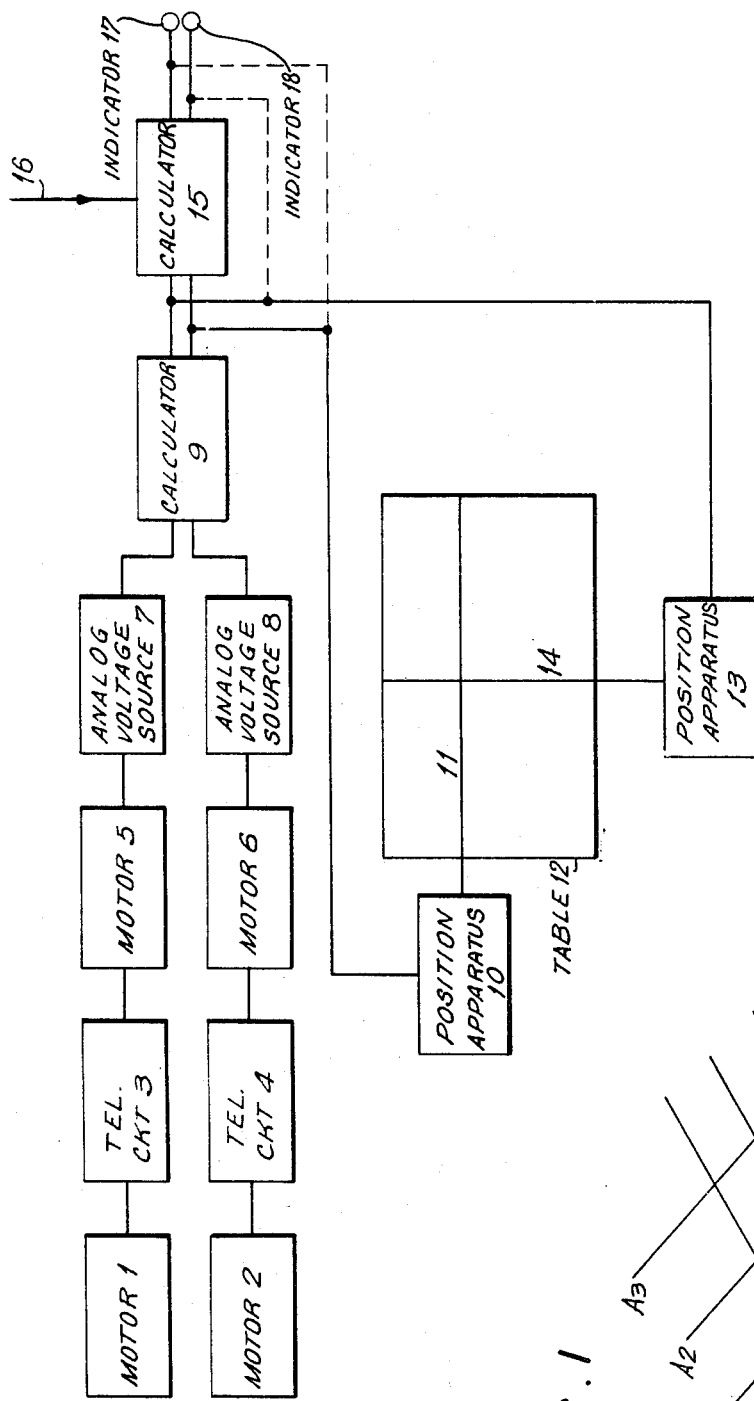
FIG. 2
FIG. 1
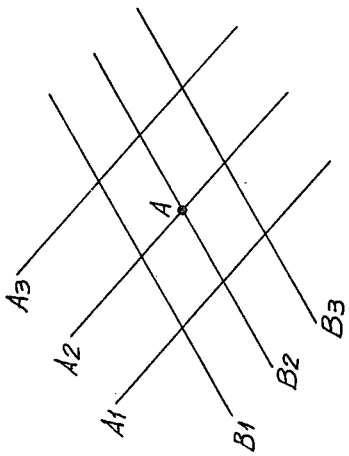

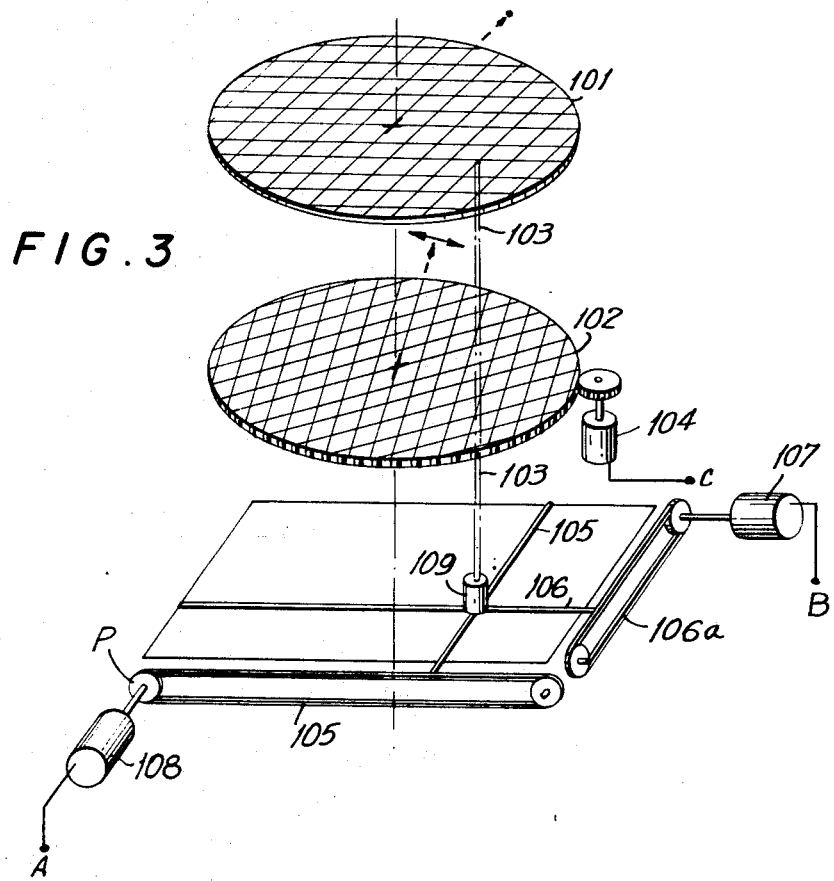
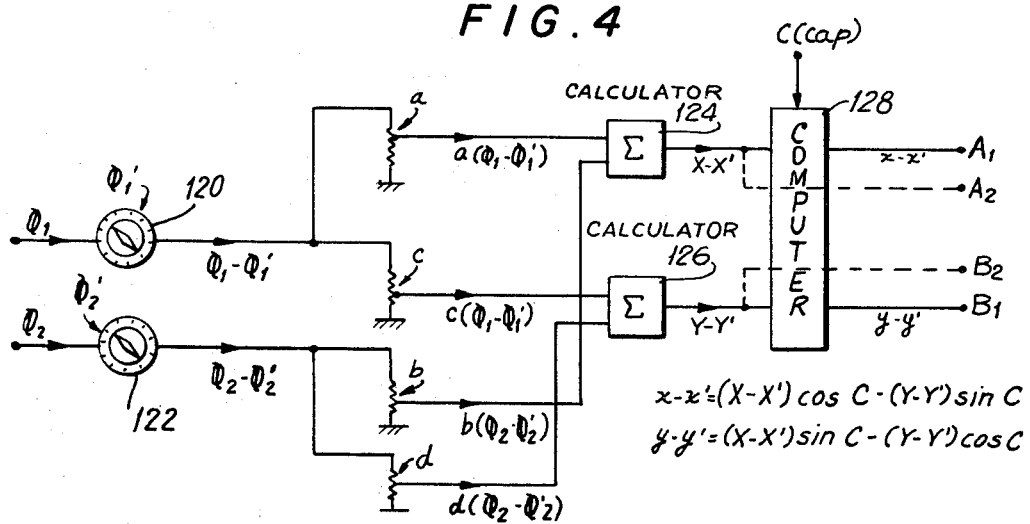

ABSTRACT OF THE DISCLOSURE

The phase values of intersecting electromagnetic waves used to locate a ship relative to two transmitting stations are converted into voltage values which are, in turn, used to locate cross-wires or the like on a table whereby the ship's position relative to a coordinate system is illustrated.

---

Our invention has for an object the setting in a predetermined position of a movable part or vehicle such as a ship so as to station it at a well defined geographical location for enabling it to execute certain operations which require its being positioned accurately, said operations consisting, for example, of prospecting or boring operations.

It is a well-known fact that it is possible to define in a highly accurate manner the location of a point for instance at sea, by measuring the relative phase of electromagnetic waves produced by different stations at stationary points since the measurement of a given phase difference allows defining the location of the vehicle on a hyperbola of which the geometrical data are defined by the geographic location of the transmitting stations and by the values of the frequencies of the radiated waves. A first system of stations supplies a first hyperbola and a second system supplies a second hyperbola and the location of the vehicle is to be found at the crossing point of said hyperbolas. It is also a well known fact that more complex arrangements allow drawing networks wherein the lines of equal differences in phase are supplied by zeroing a linear function of the distance separating the receiving station from the different transmitting stations.

The invention is also applicable in such a case. For sake of simplicity of the disclosure, however, we will limit the following description to arrangements resorting only to simple hyperbolic networks.

Our invention relies on the general method referred to and supplies on board the vehicle through suitable operations the desired components, along predetermined directions say a North-South direction and an East-West direction, of the vector separating the present location of the vehicle from the position it has to occupy.

To this end, we resort to a wireless system for the radio-location of a vehicle in accordance with the above referred to method.

The theoretical desired position of the vehicle is calculated beforehand and is defined by the value $\varphi_1$ and $\varphi_2$ of the phases given out by those hyperbolas of the two networks which cross each other at the theoretical point corresponding to the location to be occupied by the vehicle or the like movable part.

The equipment on board the vehicle supplies at any moment the values $\varphi'_1$ and $\varphi'_2$ of the phases corresponding to the actual location of the vehicle at such a moment. According to our invention the differences in phase $$\Delta\varphi_1 = \varphi'_1 - \varphi_1$$
$$\Delta\varphi_2 = \varphi'_2 - \varphi_2$$

are provided and serve for calculating and displaying the components X and Y of the vector separating the actual position of the vehicle from the theoretical desired position it is to occupy.

In order to reach such a result, our invention benefits by the fact that in the vicinity of said theoretical point the components X and Y are linear functions of the differences $\Delta\varphi_1$ and $\Delta\varphi_2$ referred to hereinabove.

This appears clearly, reference being made to FIG. 1 of the accompanying drawings, which shows that in the vicinity of the point A forming the theoretical point, the hyperbolas of a network may be considered as parallel rectilinear lines as shown at A1–A2–A3 for one of the networks and B1–B2–B3 for the other network, said point A lying at the crossing point between the hyperbolas A2 and B2, which hyperbolas cross each other along an angle the value of which is irrelevant; the spacing between said rectilinear lines is proportional to the differences in phase. The result thereof is apparent and consists in that the components X and Y are bound to the differences in phase $\Delta\varphi_1$ and $\Delta\varphi_2$ by equations of the type $$X = a\Delta\varphi_1 + b\Delta\varphi_2$$
$$Y = c\Delta\varphi_1 + d\Delta\varphi_2$$

The vehicles which are constituted for instance by ships executing works such as those referred to hereinabove, to wit prospecting and boring works at sea, should be brought into well defined and marked locations.

It is thus possible to calculate first the values $\Delta\varphi_1$ and $\Delta\varphi_2$ corresponding to the hyperbolas A2 and B2 passing through the point where the vehicle is to work. It is also possible to calculate the value of the coefficients $a$–$b$–$c$–$d$ incorporated with the above equations, said coefficients depending on the location of the point A while their value is well defined when the point A has been selected.

It will be remarked that, even in the case where the coefficients $a$, $b$, $c$, $d$ are not accurately defined, the apparatus according to the invention supplies however, through its actual principle an indication of the error in location which varies in the same direction as the actual error, the theoretical point registering always, whatever may be the values given to the coefficients $a$, $b$, $c$, $d$ with the point for which the values $\Delta\varphi_1$ and $\Delta\varphi_2$ are simultaneously equal to zero.

According to a further feature of our invention, the values X and Y allow showing graphically the location of the vehicle with reference to said theoretical point on a rectangular table over which cross-wires move in parallelism with themselves and with the edges of the tables. The location of said wires show respectively the values of X and Y so that the crossing point between said wires defines the actual position of the vehicle, the theoretical point to be reached and at which the vehicle is to be held being, through its actual definition, the center of the table in accordance with a first embodiment of our invention.

Our invention and further features thereof will be readily understood from the following description, reference being made to the accompanying drawings. In said drawings:

FIG. 1 is an explanatory graph;
FIG. 2 illustrates diagrammatically an embodiment of our invention, by way of example;
FIG. 3 is an exploded diagrammatic view of another embodiment of our invention; and FIG. 4 is a block diagram of a computer arrangement employed in accordance with the invention.

In said FIG. 2, 1 and 2 designate motors controlled by the radiolocating system defining the position of the vehicle in the manner disclosed hereinabove. The motor 1 supplies the value $\varphi_1$ of the phase measured by the first network and the motor 2 supplies the value $\varphi_2$ of the phase measured by the second network. In practice, said phases are given by the angular positions of the rotors of said motors 1 and 2. The motors 1 and 2 form part of the radiolocating system carried by the vehicle at the most suitable point of the latter. It is therefore generally necessary to transmit through telemetering means the data thus obtained to a central station including the parts to be described hereinafter. Said telemetering means are constituted by the parts illustrated diagrammatically at 3 for the motor 1 and at 4 for the motor 2. Elements 5 and 6 are the motors controlled by said telemetering means 3 and 4. The rotors of said motors repeat therefore respectively the angular positions of the rotors of the motors 1 and 2, provided their stators are keyed in the same direction as those of the motor 1 and 2.

According to a further feature of our invention, the stators of said motors 5 and 6 may be angularly shifted by an operator each round the axis of the corresponding motor so that they may be shifted at the beginning of an operation by angles equal to the phases $\varphi_1$ and $\varphi_2$ defining the theoretical point at which the vehicle should be located. Consequently, it is immediately apparent that the rotors of said motors 5 and 6 give out angular values equal respectively to $\Delta\varphi_1$ and $\Delta\varphi_2$. Said angular values are transformed into voltage values by the parts 7 and 8 of any suitable type and there are collected consequently at the outputs of 7 and 8 voltages which are respectively proportional to $\Delta\varphi_1$ and $\Delta\varphi_2$. Said voltages are fed into a suitable calculator 9 of any convenient type in which calculator have been recorded previously the values of the coefficients $a$, $b$, $c$ and $d$ obtained in the manner disclosed hereinabove.

Consequently, said calculator supplies two output voltages which are proportional respectively to the components X and Y. The voltage proportional to X controls the positioning means illustrated diagrammatically at 10 and shifting in parallelism with itself a horizontal cross-wire 11 across the rectangular table 12. Similarly the voltage proportional to Y controls further positioning means 13 shifting in parallelism with itself a vertical cross-wire 14 over said table 12.

The arrangements are designed in a manner such that, when the voltages X and Y are equal to zero, the cross-wires 13 and 14 cross each other at the center of the table, which center defines the theoretical point to be reached by the vehicle and at which it is to remain.

Consequently the operator or navigator on board the vehicle may translate immediately through mere observation of the actual crossing point between the cross-wires, which point gives out the actual location of the vehicle, its distance with reference to the center of the table or theoretical location and the direction with reference to the North of its setting with reference to the theoretical point it is to occupy.

In conformity with a further feature of our invention, the cross-wires are positioned underneath the rectangular table which latter is constituted by a ground glass while the crossing point between the cross-wire produces through any suitable means a luminous spot which is projected onto the table, which latter carries advantageously a cross ruling forming a system of coordinates. Said luminous spot is preferably produced by an optic system the axis of which is perpendicular to the plane of the table and is carried inside a die of which the center registers with the crossing point between the cross-wires.

In order to reach said result, the cross-wires are replaced advantageously by bars provided with slots the width of which is equal to that of the die which lies thus automatically at the crossing point between the slotted bars.

In conformity with a still further feature of our invention, the above-described apparatus may if required be associated with a second calculator also fed with voltages proportional to X and Y and tapped off the outputs of the first calculator 9. Said second calculator associates with said voltages and with the angular setting or head of the vehicle, the value of which head is fed to it as a voltage from a head repeater for instance, so as to produce voltages which are proportional to the coordinates of the theoretical location of the vehicle with reference to axes bound to the ship. Such a calculator is illustrated at 15 in FIG. 2 and is fed as stated with the output voltages of the first calculator 9 and also through the lead 16 transmitting indications giving out the head of the vehicle. The two outputs of this second calculator 15 control the indicators 17 and 18 which supply consequently the rectangular coordinates of a point with reference to axes bound to said vehicle.

The ground glass carrying the cross-wires is then stationary with reference to the ship and the system of coordinates is defined with reference to the North-South and East-West directions.

It is furthermore possible to associate with the second calculator 15 an auxiliary calculator supplying polar coordinates defining the location of the vehicle with reference to the theoretical point to be occupied by it, said coordinates being shown on suitable indicating means.

According to a still further feature of the invention, a second ground glass is positioned underneath or over the stationary glass; the two glasses have the same center while the second glass is angularly shiftable round said center, its angular setting being always that of the vehicle as obtained easily since the angular position of said second glass is controlled by the head repeater. Said second glass also carried a cross-ruling forming a system of coordinates and it is apparent that said system of coordinates supplies all the data relating to the position of the ship axis leewards, windwards and front to aft.

In a modification of said embodiment, it is possible to reverse the parts played by the two glasses. In so far as the location of the vehicle being assumed to be given out by the center of the table, the glass carrying the North-South and East-West ruling is controlled by the head repeater so that said glass may be set in an unvarying angular position in space, while the other glass carrying the cross-ruling corresponding to the coordinates asscciated with the vehicle is stationary with reference to the latter. Said arrangement furthers considerably, as shown by experience, the action of the pilot who has to keep the vehicle at the theoretical point required.

Of course, in such a modification the control systems 10 and 13 are connected no longer with the corresponding outputs of the first calculator 9 but with those of the second calculator 15 as illustrated in interrupted lines.

According to said last modification, it is also possible to resort to the output voltages of the calculator 15 for actuation of any means controlling the vehicle, for instance power units controlling the fore and aft, leeward and windward movements of a floating boring platform.

In the case of last-mentioned modification; it is possible to apply to the controlling voltages various corrections so as to take into account, for instance, the possible pitching and rolling movements.

Obviously, when the center of the table is assumed to illustrate the position of the vehicle, it is necessary to change the signs of the values $\Delta\phi_1$ and $\Delta\phi_2$.

It will be remarked that it is possible to check the results by resorting to a third network supplying a phase difference $\Delta\phi_3$; in such a case the collector 9 is designed so as to operate as required with the date supplied by any two networks selected as desired out of the three networks or else it may be designed so as to produce automatically the average value of the output voltages obtained by means of any two associated networks (obviously three networks may be associated in three different manners two by two).

It will be remarked lastly that our invention is applicable also to the case where the positions of the transmitters and of the receivers are exchanged.

Indeed well-known radiolocating systems exist wherein one of the transmitters is located at a stationary point and the other transmitter is located on the vehicle of which the position is to be controlled. Two receivers are located at two stationary points and measure the differences in phase, between the transmitters. These differences in phase are then transmitted through any suitable means to the vehicle on which they are transformed into voltages which are identical with those supplied by the conventional system described hereinabove, said voltages being then applied in the manner illustrated, for instance for controlling the cross-wires defining the position of the theoretical point at which the vehicle is to be located.

FIG. 3 illustrates a modification generally described in the aforegoing. In FIG. 3 the rules 105 and 106 have their extremities secured respectively to cables 105a and 106a mounted on pulleys P, one of which is controlled by the motor 107, and the other by the motor 108, At 109 there is shown a light source at the intersection of the rules, causing a luminous bundle 103 to traverse two transparent squared glass tables 101 and 102. FIG. 3 is an exploded view and, in fact, the two tables 101 and 102 rest on each other very close to the table on which the rules 105 and 106 are movable.

The table 101, which is fixed relatively to the ship and the table 102, rotates proportionally to any change in the direction C of the ship. For this purpose, its outer edge is provided with teeth meshing with a gear driven by motor 104, reproducing in this way any change in the direction of the ship.

Finally, FIG. 4 illustrates schematically a computer supplying the coordinates introducing the direction of the ship. The values $\varphi_1$ and $\varphi_2$ of phases supplied by the two networks are first converted by calculators 120 and 122 into differences $\varphi_1 - \varphi'_1$ and $\varphi_2 - \varphi'_2$. These values are respectively multiplied on the one hand by the coefficients $a$ and $c$ by means of two potentiometers $a$ and $c$, variable taps of which are positioned so as to represent respectively the values of the coefficients $a$ and $c$; and on the other hand by the coefficients $b$ and $d$ by means of potentiometers $b$ and $d$.

There are then illustrated two calculators 124 and 126 providing a summation respectively of the quantities supplied by the potentiometers $a$ and $c$ on the one hand and $b$ and $d$ on the other hand. The values thus summed are supplied to a computer 128 receiving also at its input the values C of the ship's direction and there are thus obtained at the output of this computer the following values:

$$x - x' = (X - X') \cos C - (Y - Y') \sin C$$
$$y - y' = (X - X') \sin C - (Y - Y') \cos C$$

as seen hereinabove.

What we claim is:

1. An arrangement for defining the location of a vehicle by means of electromagnetic waves supplied by two transmitters comprising means for measuring on said vehicle the phase values of the electromagnetic waves produced by said two transmitters and calculating means transforming said values into voltage values defining the actual location of the vehicle with reference to its desired position along rectangular coordinates, and synchro means for transforming the voltage values into a visually perceptible representation of said location relative to Cartesian coordinates.

2. An arrangement for defining the location of a vehicle by means of electromagnetic waves supplied by two transmitters comprising means for measuring on said vehicle the phase values of the electromagnetic waves produced by said two transmitters and calculating means transforming said values into voltage values defining the actual location of the vehicle with reference to its desired position along rectangular coordinates, the means transforming the phase values including electric motors including rotors adapted for being fed with currents the phase of which is equal to the phase of the waves produced by the corresponding transmitters when reaching the vehicle and also including stators adapted for being set in an angular position corresponding to a reference phase.

3. An arrangement for defining the location of a vehicle by means of electromagnetic waves supplied by two transmitters comprising means for measuring on said vehicle the phase values of the electromagnetic waves produced by said two transmitters and calculating means transforming said values into voltage values defining the actual location of the vehicle with reference to its desired position along rectangular coordinates, a rectangular and chart-forming table on said vehicle, intersecting cross-wires extending across the table and means whereby said voltage values shift the corresponding cross-wires over said chart in parallelism with themselves to make the crossing point between the two cross-wires define the actual position of the vehicle with reference to a predetermined reference point.

4. An arrangement for defining the location of a vehicle by means of electromagnetic waves supplied by two transmitters comprising means for measuring on said vehicle the phase values of the electromagnetic waves produced by said two transmitters and calculating means transforming said values into voltage values defining the actual location of the vehicle with reference to its desired position along rectangular coordinates, and two rectangular chart-forming ground glasses in pivotal superposed relationship one of which glasses is rigid with the vehicle, the charts respectively providing coordinates with reference to space and to the vehicle, a head indicator controlling the angular setting between the two glasses to make said angular setting equal to the head of the vehicle with reference to a predetermined position in space, crosswires extending across one of the charts in parallelism with the corresponding edges of the latter and means whereby said voltage values shift the corresponding crosswires over said chart in parallelism with themselves to make the crossing point between the two cross-wires define the actual position of the vehicle with reference to a reference point.

5. An arrangement for defining the location of a vehicle by means of electromagnetic waves supplied by two transmitters comprising means for measuring on said vehicle the phase values of the electromagnetic waves produced by said two transmitters and calculating means transforming said values into voltage values defining the actual location of the vehicle with reference to its desired position along rectangular coordinates, and a rectangular chart-forming table carried by the vehicle, said chart showing coordinates with references to space cross-wires extending across the chart in parallelism with the corresponding edges, means whereby said voltage values shift the corresponding crosswires over said chart in parallelism with themselves to make the crossing point between the two cross-wires define the actual position of the vehicle with reference to a reference point and illuminating means carried at the crossing of the crosswires and forming a luminous spot at the corresponding point of the chart.

References Cited

UNITED STATES PATENTS 2,600,484   6/1952   Copping.
2,855,595   10/1958  Koeppel _____ 343—112 X RODNEY D. BENNETT, *Primary Examiner.*

R. E. BERGER, *Assistant Examiner.*